Dec. 18, 1923.
J. HAKET
WATER KETTLE
Filed April 23, 1923
1,477,644
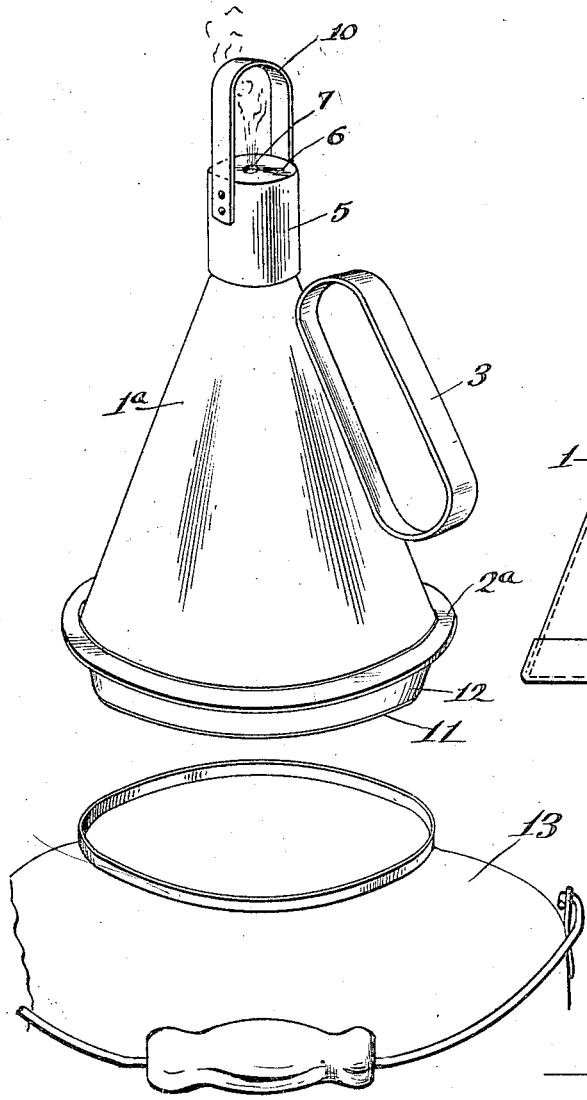
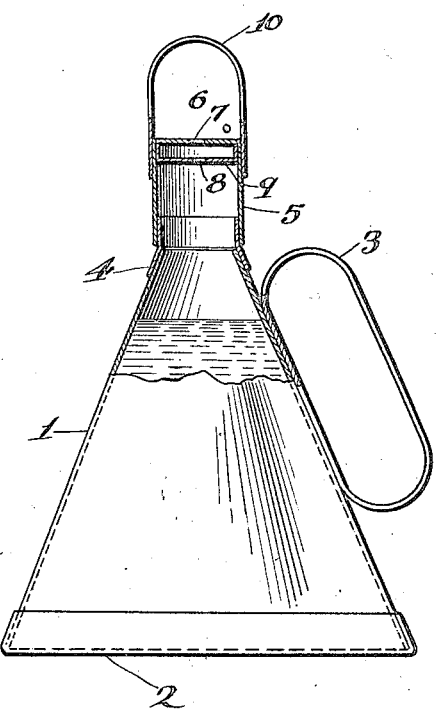
Inventor:
JOHN HAKET.
By Hazard and Miller
Attorneys Patented Dec. 18, 1923.

1,477,644

UNITED STATES PATENT OFFICE.

JOHN HAKET, OF LOS ANGELES, CALIFORNIA.

WATER KETTLE.

Application filed April 23, 1923. Serial No. 633,959.

*To all whom it may concern:*

Be it known that I, JOHN HAKET, a subject of the Queen of Netherlands, residing at Los Angeles, in the county of Los Angeles and State of California, have invented new and useful Improvements in Water Kettles, of which the following is a specification.

My present invention being a water kettle, or a novel cover suitable for use upon a water kettle or other vessel, and comprising a whistle or other audible signal, it is an especial object of this invention to provide means whereby notice may automatically be given when water or another liquid has come to a boil.

It is a matter of common knowledge that a great deal of fuel is ordinarily wasted, and water is needlessly vaporized, and kettles and similar vessels are damaged, when they are not watched; but the watching of kettles and similar vessels is a tedious and time-consuming task; and it is accordingly an object of this invention to provide means for giving auditory notification to a cook, or a housewife, or a barber, or a nurse, or any other user of hot water, or the like, that actual ebullition has begun; and my preferred means for the purpose referred to comprises a whistle adapted to be interposed in the path of escaping steam or other vapor.

For example, hot water being desired for shaving, a kettle containing only the requisite quantity of water and provided with my whistling attachment may be set over a hot flame, and the householder may then continue with other duties without fear that his kettle will burn dry or that fuel will be wasted, or that the bulk of water within the kettle will be unduly reduced by evaporation; for he may safely rely upon the mentioned whistle to notify him as soon as his water has come to a boil.

Similarly, assuming that a couple of eggs are to be prepared for an invalid by the known method of dropping them into a quart of water that has been brought to a boil and set off (for, say six minutes immediately after the eggs have been dropped into the boiling water), my whistling attachment may be employed to economize fuel, water and attention in the preparation of the boiling water; or, if it is desired that the eggs shall boil for a stated time, as one minute, they may be dropped into cold water and by noting when the whistle has begun to blow, the cook may avoid the necessity of going near them until the said whistle has been blowing for a predetermined time.

Again, when my invention is embodied suitably for use upon a vessel in which vegetables are being cooked, both the continuance and intensity of the whistling may serve to give assurance not only of the fact of ebullition, but of the rate thereof; and any appreciable diminution in the whistling sound may also give notice that the vegetables are "boiling dry." Numerous analogous uses will occur to chemists, laboratory workers, and technicians in all fields.

Although I have mentioned a few illustrative modes of employing my water kettle or the whistling cover which I may employ with any ordinary kettle or other vessel, it should be understood that these are examples merely, and that my invention may be employed also where a continuous sound is desired for the purpose of attracting the attention of passersby to an advertisement or to goods displayed, or for other purposes.

Other objects of my invention will appear from the following description of illustrative embodiments thereof, and from the appended claims, taken in connection with the accompanying drawings, in which—

Figure 1 is a vertical section of a small kettle provided with my invention.

Fig. 2 is a perspective view of an alternative form, showing my invention embodied in a cover, such as may be used to replace the usual cover of an ordinary kettle or other receptacle.

In the form of my invention shown in Figure 1, a body 1, which may be soldered to or integral with a bottom 2, is shown as provided with a handle 3, and with a neck or opening 4, through which a liquid may be introduced or withdrawn.

Adapted to fit upon or within the opening 4, I provide a whistling attachment 5, which may comprise a cylindrical body provided with a substantially horizontal top plate 6, having an aperture 7, a corresponding aperture 8 being provided in an inserted plate 9, shown as substantially parallel with the top plate 6, a guard loop 10 being optionally secured to the lateral faces of said cylindrical body to serve both as a handle for the whistling attachment and as a means to prevent accidental contact with escaping steam.

In the form of my invention shown in Figure 2, corresponding parts are employed, except that by leaving the bottom of the downwardly expanding conical body 1ª open, and optionally providing a substantially horizontal flange 2ª thereon, I may adapt the parts referred to to be substituted for the usual cover of an ordinary kettle or other receptacle, the downwardly projecting collar 11 being preferably tapered and optionally provided with a gasket 12, to insure a suitable fit. It will be obvious that when a cover of the sort here referred to is employed upon an ordinary closed kettle, or upon a cooking vessel 13 of any preferred type, the escape of steam through the apertures 7 and 8 will result in a whistling sound, as soon as water in the vessel comes to a boil, and that this whistling will continue as long as steam continues to escape, the rate of escape being readily indicated by the loudness of the consequent noise.

Although I have described preferred and alternative forms of my invention, it will be understood that various features thereof might be independently employed, and that various modifications might be made therein, without departure from the spirit and scope of my invention, as the same is indicated above and in the following claims.

What I claim is:

1. In a whistling attachment adapted to be used upon kettles, a removable top interfitting with the neck of a conical body and provided with a plurality of corresponding apertures, one of said apertures being formed in a substantially horizontal surface of said removable top, and the other of said apertures being formed in an inserted, separate plate.

2. In a whistling attachment adapted to be used upon kettles, a removable top provided with a plurality of corresponding apertures, one of said apertures being formed in said removable top, and another of said apertures being formed in an inserted plate substantially parallel therewith, and means for supporting said top in place of a kettle cover.

In testimony whereof I have signed my name to this specification.

JOHN HAKET.